(No Model.)

W. M. DAVIS.
METHOD OF PRESERVING FRUITS.

No. 354,184. Patented Dec. 14, 1886.

Witnesses
Jos. S. Larimer
J. J. Sheehy.

Inventor
Wm. M. Davis.
By his Attorney
Frank Sheehy.

UNITED STATES PATENT OFFICE.

WILLIAM M. DAVIS, OF LAKE CITY, FLORIDA, ASSIGNOR OF TWO-THIRDS TO J. F. BAYA AND J. D. CALLAWAY, BOTH OF SAME PLACE.

METHOD OF PRESERVING FRUITS.

SPECIFICATION forming part of Letters Patent No. 354,184, dated December 14, 1886.

Application filed July 24, 1886. Serial No. 208,935. (No model.)

*To all whom it may concern:*

Be it known that I, WILLIAM M. DAVIS, a citizen of the United States, residing at Lake City, in the county of Columbia and State of Florida, have invented certain new and useful Improvements in Preserving Oranges and other Citrus Fruits; and I do declare the following to be a full, clear, and exact description of the invention, such as will enable others skilled in the art to which it appertains to make and use the same, reference being had to the accompanying drawings, and to the letters and figures of reference marked thereon, which form part of this specification.

This invention relates to a new and improved method of preserving oranges and other fruit from decay, and at the same time preventing them from being bruised during transportation or handling in bulk, as will be fully understood from the following description, when taken in connection with the annexed drawings, in which—

Figure 1:
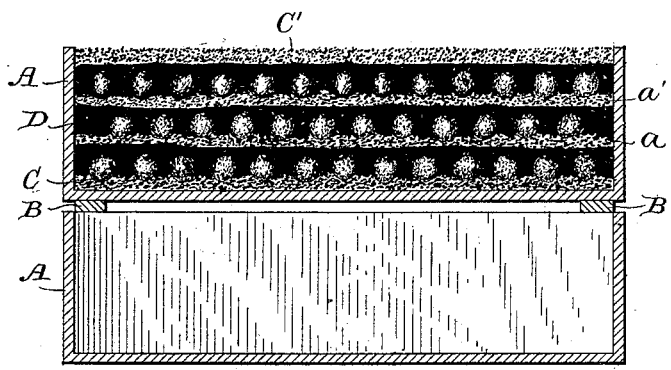
Figure 2:
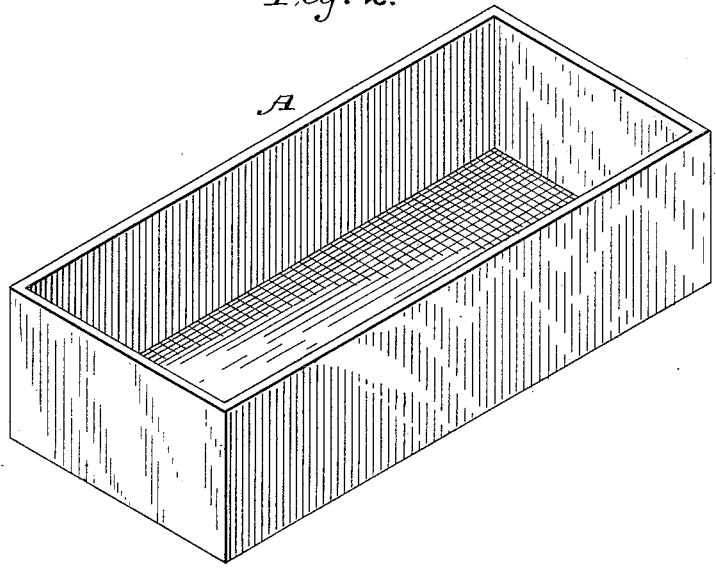

Figure 1 is a vertical longitudinal section through two of the packing-boxes, the upper one of which is represented filled. Fig. 2 is a perspective view of one of the empty packing boxes or trays.

In carrying into effect my invention, I prefer to use wooden boxes made of one-inch planks, the boxes being four feet long, two feet wide, and one foot deep, having bottoms but no covers, unless wanted for transportation. I employ as the packing materials for such a box clean dry sand; also a compound consisting of three quarts of pulverized charcoal, to which is added and thoroughly mixed with the charcoal two drams of carbolic acid. These proportions may be varied as circumstances require.

*Method of packing.*—I spread evenly on the bottom of a box, A, a layer of clean dry sand about one-half an inch deep. I then take oranges that have been gathered about one week and kept in a dry place, and arrange them on said layer, C, of sand so that they do not touch each other nor the sides of the box. On this layer of oranges I carefully sprinkle about one-third of the prepared charcoal above described. This layer of the prepared charcoal is then covered with another layer of sand (indicated by letter $a$, Fig. 1) until the fruit is entirely hidden and embedded. A second layer of oranges is then arranged, as above described, on the sand layer $a$, and covered by a sprinkling of the prepared charcoal, (one-third,) and then a layer of sand, $a'$. A third layer of oranges is then arranged upon the last layer, $a'$, and the remaining third of prepared charcoal sprinkled upon them, after which the box is filled to its top with sand, as indicated by $C'$.

Several packed boxes may be mounted, one upon the other, with strips B interposed for allowing free ventilation of air.

Fruit thus packed should be kept from the sun and rain.

I am aware that it is not new to preserve fruits by embedding them in sand or charcoal, and that it is old to form an antiseptic by combining carbolic acid, charcoal, lycopodium, starch, alcohol, and plaster-of-paris.

Having described my invention, I claim as new—

1. The method herein described of preserving oranges from decay, consisting in packing the same in horizontal layers in a suitable box, and alternating these layers with charcoal and carbolic acid and dry sand, substantially as described.

2. The method of packing oranges herein described, consisting in spreading a thin layer of dry clean sand over the bottom of a suitable box, arranging a layer of oranges upon this sand so that they neither touch each other nor the sides of the box, sprinkling a compound of charcoal and carbolic acid over the oranges, and then covering the same with clean dry sand, as specified.

In testimony whereof I affix my signature in presence of two witnesses.

WILLIAM M. DAVIS.

Witnesses:
J. F. BAYA,
J. D. CALLAWAY.